US012722501B2

(12) United States Patent
Iimura et al.

(10) Patent No.: US 12,722,501 B2
(45) Date of Patent: Sep. 1, 2026

(54) LIMITING VELOCITY ON A MOBILE BODY WITH SWIVEL CASTERS

(71) Applicant: HONDA MOTOR CO., LTD., Tokyo (JP)

(72) Inventors: Taiki Iimura, Saitama (JP); Kazumasa Ozaki, Saitama (JP); Hiroshi Iwakami, Saitama (JP); Shinichiro Kobashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 18/601,430

(22) Filed: Mar. 11, 2024

(65) Prior Publication Data

US 2024/0326606 A1 Oct. 3, 2024

(30) Foreign Application Priority Data

Mar. 30, 2023 (JP) ................................ 2023-056066

(51) Int. Cl.
*B60L 15/20* (2006.01)
*B60B 19/00* (2006.01)
*B60K 31/00* (2006.01)

(52) U.S. Cl.
CPC ............ *B60L 15/20* (2013.01); *B60B 19/003* (2013.01); *B60K 31/00* (2013.01); *B60L 2240/12* (2013.01); *B60L 2240/22* (2013.01)

(58) Field of Classification Search
CPC ............................... B60L 15/20; B60B 19/003
See application file for complete search history.

(56) References Cited

U.S. PATENT DOCUMENTS 4,534,433 A * 8/1985 Burbank ............... B60B 33/045 180/21
8,788,150 B2 7/2014 Hwang
9,242,561 B2 1/2016 Katayama
(Continued)

FOREIGN PATENT DOCUMENTS

EP 3943366 A1 1/2022
JP 2023040562 A 3/2023
WO 2021039918 A1 3/2021

OTHER PUBLICATIONS

Extended European Search Report for EP Patent Application No. 24164363.4 dated Sep. 12, 2024; 5 pp.

*Primary Examiner* — Jess Whittington
(74) *Attorney, Agent, or Firm* — Armstrong Teasdale LLP

(57) ABSTRACT

A mobile body includes: left and right driving wheels provided on a main body; a drive unit for driving each of the driving wheels; left and right swivel casters; and a controller for controlling the drive unit. The controller includes: an estimation unit for estimating a front-rear distance between a ground contact position of the swivel caster and a center of gravity; a limit velocity calculation unit for calculating a stability limit velocity based on the front-rear distance estimated by the estimation unit, a front-rear distance between a ground contact position of the driving wheel and the center of gravity, a cornering power of the driving wheel, and a cornering power of the swivel caster when a predetermined calculation condition is satisfied; and a driving control unit for controlling the drive unit such that a velocity of the mobile body is less than or equal to the stability limit velocity.

10 Claims, 13 Drawing Sheets

(56) References Cited

U.S. PATENT DOCUMENTS

| | | | | |
|---|---|---|---|---|
| 9,650,061 | B2 | 5/2017 | Katayama et al. | |
| 10,328,748 | B1 * | 6/2019 | Kim | B60B 33/0015 |
| 11,993,279 | B1 * | 5/2024 | Roy | G01C 21/3453 |
| 2009/0018725 | A1 * | 1/2009 | Ono | B60T 8/17551 701/36 |
| 2013/0261898 | A1 * | 10/2013 | Fujita | B62D 7/159 701/42 |
| 2015/0237802 | A1 * | 8/2015 | Bucharzewski | B60B 33/006 16/18 R |
| 2020/0047552 | A1 * | 2/2020 | Fawcett | B60B 33/0071 |
| 2020/0283092 | A1 * | 9/2020 | Doerksen | B62M 6/50 |
| 2023/0035700 | A1 * | 2/2023 | Iimura | B62B 5/0033 |
| 2024/0239331 | A1 * | 7/2024 | Kamio | B60W 10/08 |

* cited by examiner (A)
(B)
1
2
2A
2B
3
5
6
8
10
12
17
17A
17B
19
27
35
36
40
42
42A
42B
43,45
H
L1
L2
up(z)
down
rear
left
right(y)
front(x)

Figure 5:
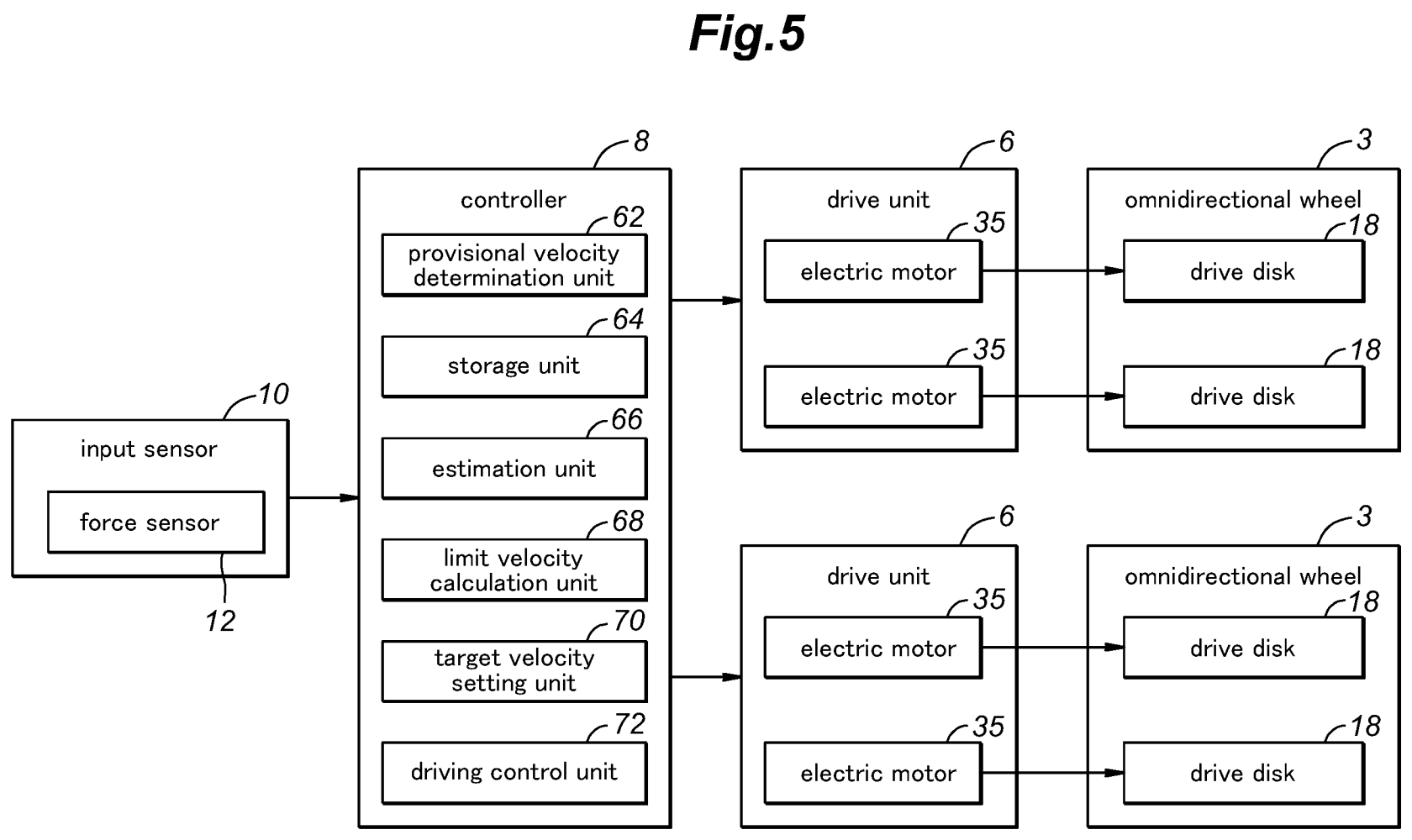

Fig.5 input sensor 10
force sensor 12 controller 8
provisional velocity determination unit 62
storage unit 64
estimation unit 66
limit velocity calculation unit 68
target velocity setting unit 70
driving control unit 72 drive unit 6
electric motor 35
electric motor 35 drive unit 6
electric motor 35
electric motor 35 omnidirectional wheel 3
drive disk 18
drive disk 18 omnidirectional wheel 3
drive disk 18
drive disk 18

Fig.9A $C_\theta$ $V$

O $\frac{L_r}{L_f + L_r}$ $\frac{K_f L_f}{K_f L_f - K_r L_r}$ $\sqrt{\frac{2K_r L_r (L_f + L_r)}{m L_f}}$

Fig.9B $C_{W_z}$ $V$

O $\sqrt{-\frac{K_f K_r}{2m(K_f L_f - K_r L_r)}}$ $\sqrt{-\frac{2K_f K_r (L_f + L_r)^2}{m(K_f L_f - K_r L_r)}}$

Fig. 11A $C_\theta$ $V$

O $\sqrt{\frac{2K_fK_r(L_f+L_r)^2}{m(K_fL_f-K_rL_r)}}$ $\frac{K_fL_f}{K_fL_f-K_rL_r}$ $\frac{L_r}{L_f+L_r}$

Fig. 11B $C_{w_z}$ $V$

O $\sqrt{\frac{2K_fK_r(L_f+L_r)^2}{m(K_fL_f-K_rL_r)}}$

Fig.12B
front rear
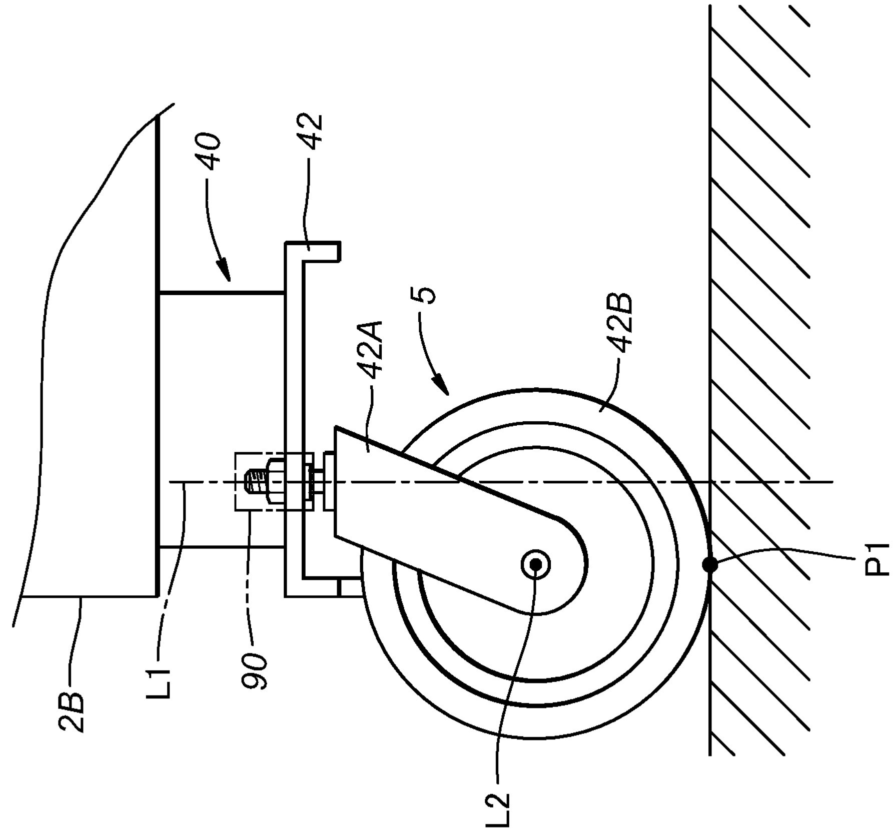
Fig.12A
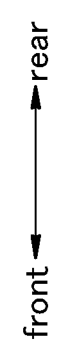
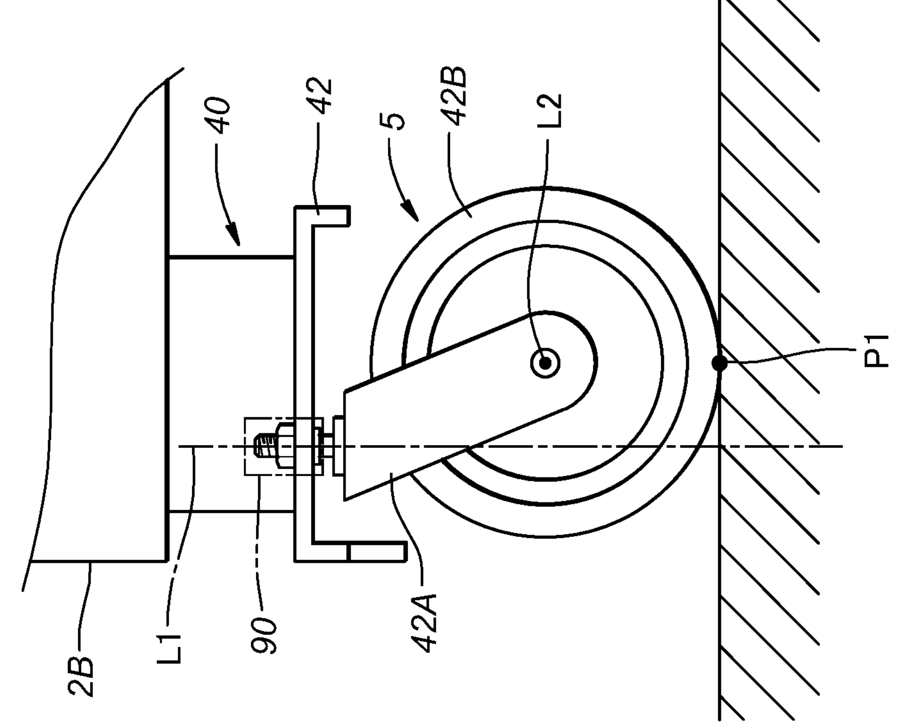

LIMITING VELOCITY ON A MOBILE BODY WITH SWIVEL CASTERS

TECHNICAL FIELD

The present invention relates to a mobile body.

BACKGROUND ART

WO2021/039918A1 discloses a cart having two rotation mechanisms and four wheels. The two rotation mechanisms rotate independently from each other to move the main body. The four wheels rotate along with the movement of the main body.

It may be conceived to configure a mobile body having two left and right driving wheels as rear wheels and two left and right swivel casters as front wheels by using a rotation mechanism similar to that disclosed in WO2021/039918A1 as each of the driving wheels. However, the inventors found that in such a mobile body, depending on the driving state of the rotation mechanisms, the travel direction of the mobile body, and the like, the main body of the mobile body may spin or otherwise the traveling of the mobile body can be unstable.

SUMMARY OF THE INVENTION

In view of the foregoing background, a primary object of the present invention is to provide a mobile body that can travel stably.

Means to Accomplish the Task

To achieve the above object, one aspect of the present invention provides a mobile body (1), comprising: a main body (2); a pair of left and right driving wheels (3) provided on the main body; a drive unit (6) configured to drive each of the driving wheels; a pair of left and right swivel casters (5) respectively provided in front of the driving wheels, and each supported on the main body to be swivelable about an axis extending in an up-down direction; and a controller (8) configured to control the drive unit, wherein the controller comprises: an estimation unit (66) configured to estimate a front-rear distance between a ground contact position (P1) of the swivel caster and a center of gravity (G); a limit velocity calculation unit (68) configured to calculate a stability limit velocity ($V_{max}$) based on the front-rear distance ($L_f$) estimated by the estimation unit, a front-rear distance ($L_r$) between a ground contact position (P2) of the driving wheel and the center of gravity, a cornering power ($K_r$) of the driving wheel, and a cornering power ($K_f$) of the swivel caster when a predetermined calculation condition is satisfied; and a driving control unit (72) configured to control the drive unit such that a velocity of the mobile body is less than or equal to the stability limit velocity when the stability limit velocity is calculated by the limit velocity calculation unit.

According to this aspect, since the velocity of the mobile body is controlled to be less than or equal to the stability limit velocity when the stability limit velocity is calculated, a mobile body that can travel stably is provided.

In the above aspect, preferably, the limit velocity calculation unit calculates the stability limit velocity according to a formula (A) below, $$V_{max} = \sqrt{\frac{2K_f K_r (L_f + L_r)^2}{m(K_f L_{f-K_r L_r})}} \quad (A)$$

wherein $V_{max}$ represents the stability limit velocity, m represents a mass of the mobile body, $K_f$ represents the cornering power of the swivel caster, $K_r$ represents the cornering power of the driving wheel, $L_f$ represents the front-rear distance between the ground contact position of the swivel caster and the center of gravity, and $L_r$ represents the front-rear distance between the ground contact position of the driving wheel and the center of gravity.

According to this aspect, the stability limit velocity can be properly calculated.

In the above aspect, preferably, each driving wheel is an omnidirectional wheel capable of translational movement in a left-right direction.

According to this aspect, the mobile body can undergo a translational movement in all directions.

In the above aspect, preferably, the calculation condition includes $K_f L_f - K_r L_r > 0$.

According to this aspect, the calculation condition in which the calculation of the stability limit velocity is necessary can be properly acquired.

In the above aspect, preferably, the mobile body comprises: an input sensor (10) provided on the main body to receive an operation input regarding an operation of the mobile body from an operator; a provisional velocity determination unit (62) configured to calculate a provisional velocity, which is a tentative moving velocity, based on the operation input acquired by the input sensor; and a target velocity setting unit (70) configured to determine a target velocity based on the provisional velocity calculated by the provisional velocity determination unit, wherein when the stability limit velocity is calculated by the limit velocity calculation unit and a magnitude of the provisional velocity calculated by the provisional velocity determination unit is greater than a magnitude of the stability limit velocity, the target velocity setting unit calculates a coefficient by dividing the magnitude of the stability limit velocity by the magnitude of the provisional velocity and acquires the target velocity by multiplying the provisional velocity by the coefficient, and the driving control unit controls the drive unit so as to cause the mobile body to move at the target velocity.

According to this aspect, the velocity of the mobile body can be limited within a velocity range in which a stable movement is possible.

In the above aspect, preferably, the provisional velocity determination unit calculates a provisional yaw rate, which is a tentative yaw rate, based on the operation input, the target velocity setting unit acquires a target yaw rate by multiplying the provisional yaw rate by the coefficient when the stability limit velocity is calculated by the limit velocity calculation unit and the magnitude of the provisional velocity is greater than the magnitude of the stability limit velocity, and the driving control unit controls the drive unit such that a yaw rate of the mobile body becomes the target yaw rate.

According to this aspect, when limiting the velocity of the mobile body within the velocity range in which a stable movement is possible, the yaw rate of the mobile body can be properly set.

In the above aspect, preferably, the calculation condition is that $K_f L_f - K_r L_r > 0$ and a magnitude of the provisional yaw rate is greater than or equal to a predetermined threshold value.

According to this aspect, a timing when the velocity of the mobile body should be limited so that a stable movement of the mobile body is possible can be properly acquired.

In the above aspect, preferably, the estimation unit estimates a direction of a wheel (42B) of each swivel caster based on the provisional velocity and estimates the front-rear distance between the ground contact position of the swivel caster and the center of gravity based on the direction of the wheel of each swivel caster.

According to this aspect, in a case where the ground contact position of each swivel caster changes depending on the direction of the swivel caster, the stability limit velocity can be properly calculated.

According to the foregoing configuration, it is possible to provide a mobile body that can travel stably.

BRIEF DESCRIPTION OF THE DRAWINGS

FIG. 5 is a functional block diagram of the cart;

FIG. 9A is a graph showing the V-dependency of $C_\theta(V, L_f)$ when $K_fL_f-K_rL_r<0$;

FIG. 9B is a graph showing the V-dependency of $C_{wz}(V, L_f)$ when $K_fL_f-K_rL_r<0$;

FIG. 11A is a graph showing the V-dependency of Co (V, $L_f$) when $K_fL_f-K_rL_r>0$;

FIG. 11B is a graph showing the V-dependency of $C_{wz}(V, L_f)$ when $K_fL_f-K_rL_r>0$;

FIG. 12A is a side view showing a posture of the swivel caster during forward movement;

FIG. 12B is a side view showing a posture of the swivel caster during backward movement.

DETAILED DESCRIPTION OF THE INVENTION

In the following, an embodiment in which a mobile body according to the present invention is embodied as a cart 1 will be described with reference to the drawings. Note, however, that the mobile body according to the present invention is not limited to the cart 1, and the present invention may be applicable to any vehicle, such as a wheelchair, a wagon for carrying goods, etc., for example.

The cart 1 is a mobile body used to carry and transport goods, and is provided on one end thereof with a handle H for an operator to grip. When the operator grips the handle H and pushes forward, the cart 1 is self-propelled forward according to a load inputted from the operator.

In the following, description will be made of with the front, rear, left, right, up, and down directions of the cart 1 being defined based on the state in which the cart 1 is placed on a horizontal surface as shown in part (A) of FIG. 1, where the side on which the handle H is provided is defined as a rear side. Note, however, that the definition of the directions is for convenience of explanation, and the present invention is not limited by such definition of the directions. Also, in the following, description may be made with the forward direction being referred to as an x axis positive direction, the left direction being referred to as a y axis positive direction, and the upward direction being referred to as a z axis positive direction when necessary, but the present invention is also not limited by such association of directions with the coordinate axes.

Further, in the following description, it is assumed for the sake of simplicity that the weight of the cart 1 is sufficiently greater than the weight of the goods placed on the cart 1, and that the position of the center of gravity of the cart 1 on which the goods are loaded is substantially the same as the position of the center of gravity of the cart 1 on which no goods are loaded.

Next, the structure of the cart 1 will be described in detail.

Figure 1:
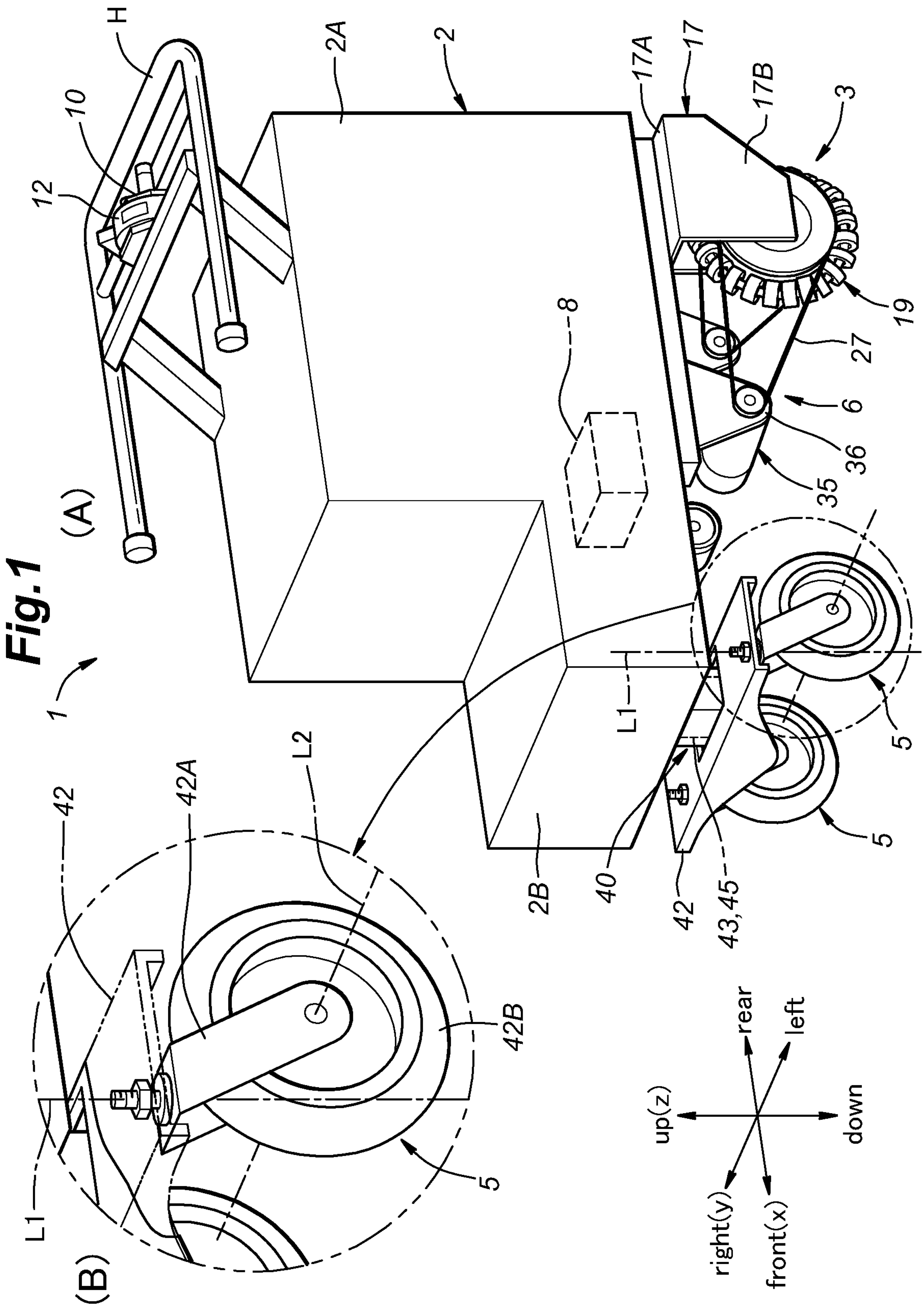
FIG. 1 shows a perspective view of a cart according to an embodiment of the present invention in part (A) thereof, and a partial enlarged view of a swivel caster of the cart in part (B) thereof.
Figure 2:
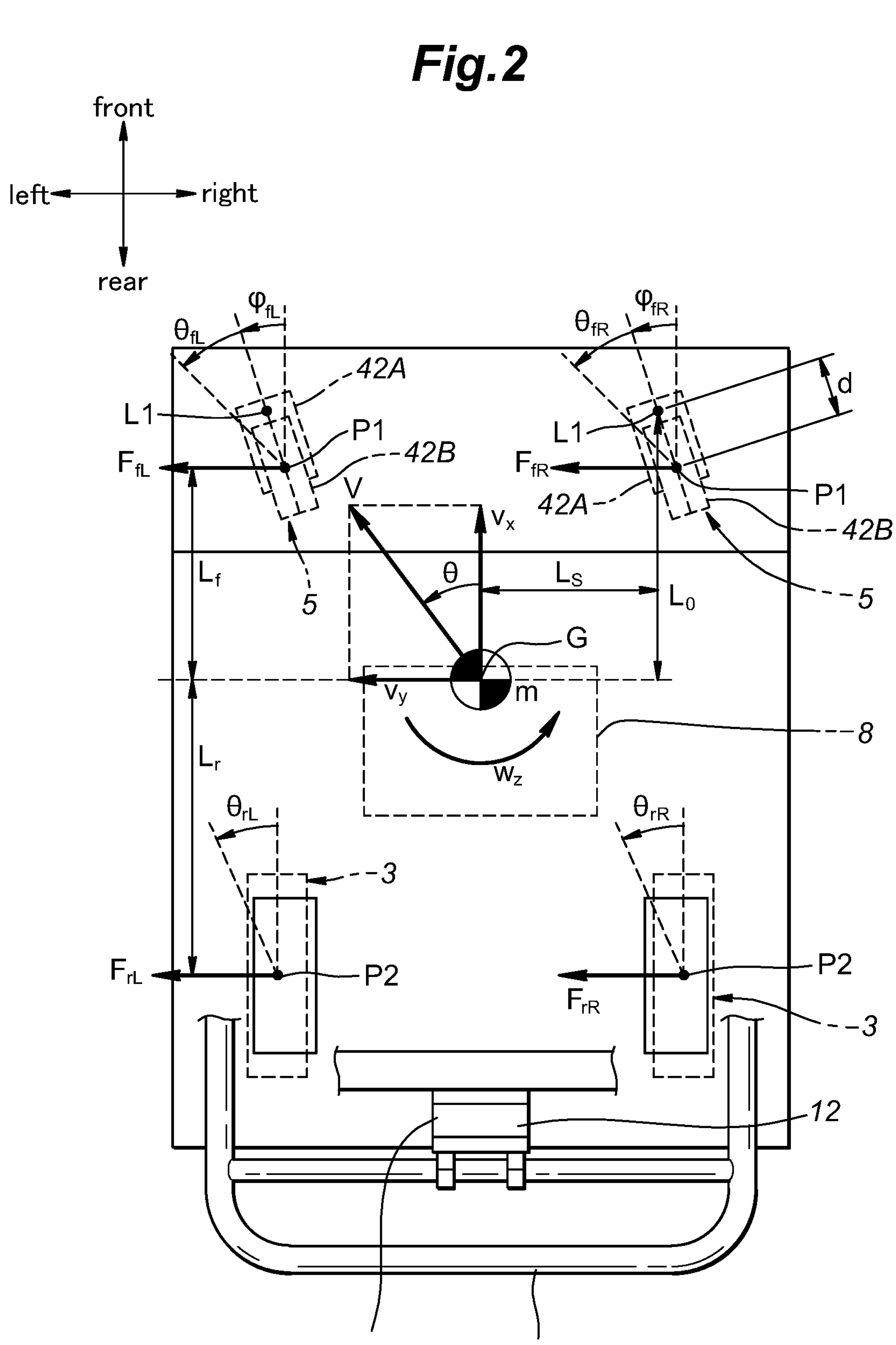
FIG. 2 is a plan view of the cart.

As shown in part (A) of FIG. 1 and FIG. 2, the cart 1 includes a main body 2, a pair of left and right omnidirectional wheels 3 serving as driving wheels, a pair of left and right swivel casters 5 serving as non-driving wheels (see also part (B) of FIG. 1), a pair of drive units 6 for driving the corresponding omnidirectional wheels 3, and a controller 8 for controlling the drive units 6.

The main body 2 has a substantially rectangular parallelepiped shape extending in the front-rear direction. An upper surface of a front portion of the main body 2 constitutes a substantially horizontal and flat load bed. A rear portion 2A of the main body 2 protrudes upward compared to a front portion 2B. The handle H is provided on the upper end of the rear portion 2A of the main body 2.

The main body 2 is further provided with an input sensor 10 for detecting an operation input from the operator to the handle H and outputting the detection result to the controller 8.

The input sensor 10 is preferably composed of a force sensor 12 for detecting the force and/or moment applied to the handle H. The force sensor 12 may be a known six-axis force sensor of any type, such as a strain gauge type, a piezoelectric type, an optical type, an electrostatic capacitance type, etc. In the present embodiment, the force sensor 12 detects a load in the front-rear direction (hereinafter, the longitudinal load), a load in the left-right direction (hereinafter, the lateral load), and a moment about an up-down axis (z axis) (yaw moment) that are applied to the handle H, and outputs them to the controller 8. When the cart 1 is placed on a horizontal surface, the up-down axis corresponds to the vertical axis.

The pair of omnidirectional wheels 3 is provided on a lower portion of the rear portion 2A of the main body 2. In the present embodiment, the omnidirectional wheels 3 are disposed under a left part and a right part of the rear portion 2A of the main body 2, respectively. The omnidirectional wheels 3 are wheels for causing the main body 2 to undergo a translational movement (translation) in the front-rear direction or the left-right direction or for causing the main body 2 to turn (spin turn). The omnidirectional wheels 3 are preferably composed of omni wheels or mecanum wheels, for example.

Figure 3:
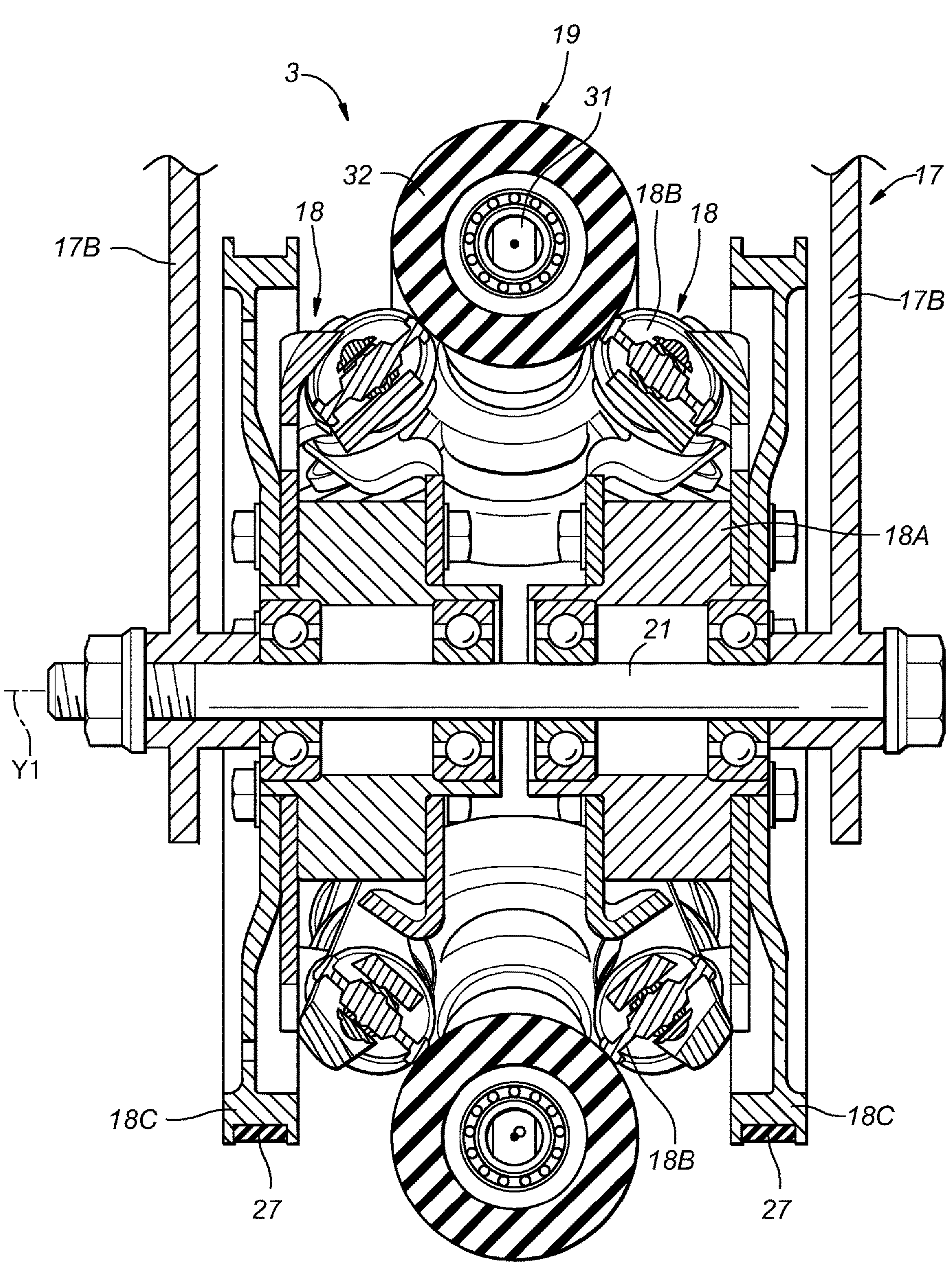
FIG. 3 is a sectional view of an omnidirectional wheel.

As shown in FIG. 3, in the present embodiment, each omnidirectional wheel 3 includes a frame 17, a pair of drive disks 18 rotatably supported by the frame 17, and an annular main wheel 19 disposed between the drive disks 18.

The frame 17 includes a frame upper portion 17A fixed to the lower portion of the main body 2, and a pair of frame side portions 17B respectively extending downward from the left and right ends of the frame upper portion 17A. A support shaft 21 extends laterally between the lower ends of the frame side portions 17B. Each of the drive disks 18 is rotatably supported on the support shaft 21.

The drive disks 18 are disposed on both sides of the annular main wheel 19 and apply frictional force to the main wheel 19 to rotate the main wheel 19 about a central axis and an annular axis. Each drive disk 18 includes a disk-shaped base 18A rotatably supported by the frame 17 and multiple drive rollers 18B rotatably supported on the outer periphery of the base 18A while being inclined with respect to each other and in contact with the main wheel 19. The base 18A is disposed coaxially with the support shaft 21.

Figure 4:
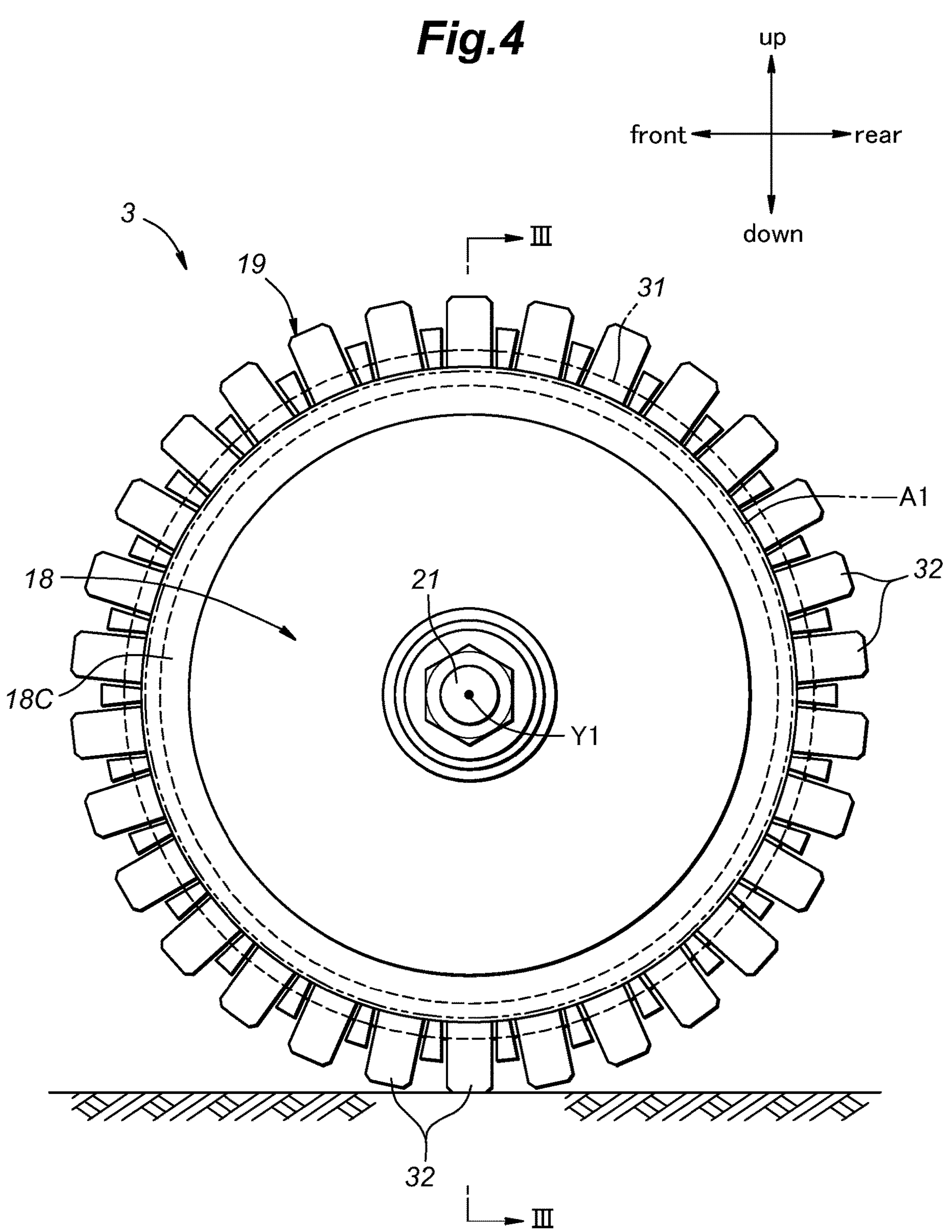
FIG. 4 is a side view of a main wheel.

As shown in FIG. 4, the main wheel 19 has an annular shape, is disposed between the drive disks 18 to be coaxial with the drive disks 18, is in contact with the multiple drive rollers 18B, and is rotatable about the central axis and the annular axis. The main wheel 19 includes an annular core 31 and multiple driven rollers 32 rotatably supported by the core 31. The multiple driven rollers 32 are arranged at equal intervals in the circumferential direction of the core 31. Each driven roller 32 is supported by the core 31 to be rotatable about an axis A1 (annular axis) of the annular core 31. Each driven roller 32 can rotate about a tangent line on the core 31 at its respective position relative to the core 31. Each driven roller 32 rotates with respect to the core 31 upon receiving an external force.

The main wheel 19 is disposed along the outer periphery of the pair of drive disks 18 and is in contact with the multiple drive rollers 18B provided on each drive disk 18. The drive rollers 18B of the left and right drive disks 18 contact the inner periphery of the main wheel 19 and sandwich the main wheel 19 from left and right sides. Further, the drive rollers 18B of the left and right drive disks 18 restrict the radial displacement of the main wheel 19 about the axis Y1 of the drive disks 18 by contacting the inner periphery of the main wheel 19. In this way, the main wheel 19 is supported by the left and right drive disks 18, and the central axis of the main wheel 19 (core 31) is disposed coaxially with the axis Y1 of the left and right drive disks 18. The main wheel 19 contacts the multiple drive rollers 18B of the left and right drive disks 18 at the multiple driven rollers 32.

The drive units 6 are installed in the main body 2 and output a driving force for driving the corresponding omnidirectional wheels 3. The drive units 6 preferably include electric motors 35 for driving the omnidirectional wheels 3 independently from each other by using the electric power supplied from the battery installed in the cart 1 based on the signal from the controller 8.

In the present embodiment, the drive units 6 are provided under the main body 2 to correspond to the respective omnidirectional wheels 3. Since two omnidirectional wheels 3 are provided, two drive units 6 are provided on the cart 1, and each drive unit 6 is provided with two electric motors 35 corresponding to the two drive disks 18 of each omnidirectional wheel 3, as shown in FIG. 5. Thus, the cart 1 is provided with four electric motors 35 in total.

To transmit the output of each drive unit 6 to the corresponding omnidirectional wheel 3, a power transmission mechanism is provided between each of the two electric motors 35 of the drive unit 6 and the corresponding one of the two drive disks 18 of the omnidirectional wheel 3. As shown in FIGS. 1 and 3, the power transmission mechanism is composed of a drive pulley 36 provided on the output shaft of the electric motor 35, a driven pulley 18C provided on the outward facing surface of the drive disk 18 in a coaxial manner, and a belt 27 wound between the drive pulley 36 and the driven pulley 18C. The two electric motors 35 of each drive unit 6 are rotated independently from each other, whereby the two drive disks 18 of each omnidirectional wheel 3 are rotated independently from each other.

When the two electric motors 35 included in each drive unit 6 are driven to rotate the corresponding two drive disks 18 in the same direction at the same rotation speed, the main wheel 19 rotates together with the two drive disks 18. That is, the main wheel 19 rotates forward or backward about its own rotation axis which coincides with the axis Y1. In this way, the main wheel 19 generates a driving force in the front-rear direction. At this time, the drive rollers 18B of each drive disk 18 and the driven rollers 32 of the main wheel 19 do not rotate with respect to the core 31.

When the two electric motors 35 included in each drive unit 6 are driven to rotate the corresponding two drive disks 18 such that a rotation speed difference occurs therebetween, a force component perpendicular to the force in the circumferential (tangential) direction caused by the rotation of the two drive disks 18 acts on the driven rollers 32 of the main wheel 19 from the left and right drive rollers 18B. Such a force component is generated due to the rotation speed difference between the drive disks 18 because the axis of each drive roller 18B is inclined with respect to the circumferential direction of the associated drive disk 18. This force component causes the drive rollers 18B to rotate relative to the base 18A and the driven rollers 32 to rotate relative to the core 31. In this way, the main wheel 19 generates a driving force in the left-right direction.

When the two drive units 6 cause the corresponding omnidirectional wheels 3 to rotate forward at the same speed, the cart 1 moves forward (undergoes forward translation). When the two drive units 6 cause the corresponding omnidirectional wheels 3 to rotate backward at the same speed, the cart 1 moves backward (undergoes backward translation).

When the two drive units 6 cause the left and right omnidirectional wheels 3 to rotate forward (or backward) with a rotation speed difference therebetween, the cart 1 turns right or left. When the two drive units 6 cause the left and right omnidirectional wheels 3 to rotate in opposite directions at the same rotation speed, the cart 1 turns (spins) there. When the two drive units 6 each cause the driven rollers 32 of the main wheel 19 of the corresponding omnidirectional wheel 3 to rotate to exert a driving force in the same left direction (right direction), the cart 1 undergoes a translational movement to the left (to the right).

As shown in FIG. 1, the swivel casters 5 are casters that are swivelable and are provided under the main body 2. The swivel casters 5 are preferably supported under the main body 2 via a suspension 40. In the present embodiment, the swivel casters 5 are provided on the front portion 2B of the main body 2 to be positioned forward of the omnidirectional wheels 3.

In the present embodiment, the suspension 40 includes an arm 42 disposed below the main body 2 and extending laterally, and a spring 43 (also called a cushion spring) and a shock absorber 45 (also called a damper) disposed between the main body 2 and the arm 42.

The swivel casters 5 are disposed below the left end and the right end of the arm 42. Each swivel caster 5 includes a fork 42A joined to the arm 42 to be rotatable about an axis L1 that extends vertically, and a disk-shaped wheel 42B supported by the fork 42A to be rotatable about an axis L2 that extends in the horizontal direction. The fork 42A rotates (turns) freely relative to the arm 42 about the axis L1, and the wheel 42B rotates freely relative to the fork 42A. Thereby, the wheel 42B is supported on the main body 2 to be swivelable about the axis L1 which extends in the up-down direction and to be rotatable about the axis L2 which extends in the horizontal direction.

As shown in FIG. 1, in the present embodiment, the axis L1 and the axis L2 do not intersect each other and are in a skew position. Therefore, a ground contact position P1 of each swivel caster 5 changes with rotation of the fork 42A about the axis L1.

On the other hand, the main wheel 19 of each omnidirectional wheel 3 is supported on the main body 2 via the frame 17. Since the frame 17 is fixed to the main body 2, the position of each omnidirectional wheel 3 does not change, and a ground contact position P2 of the omnidirectional wheel 3 with respect to the center of gravity G of the cart 1 does not change.

Figure 6:
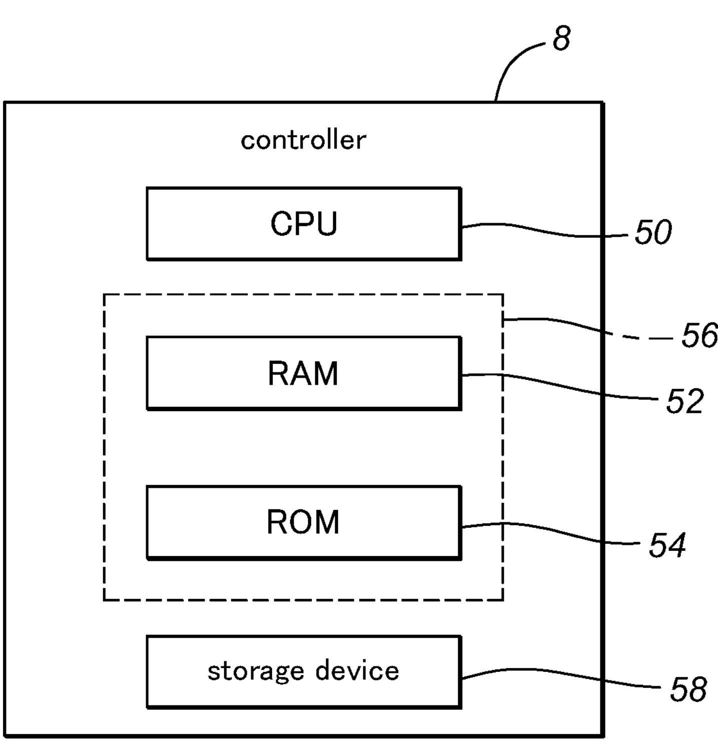
FIG. 6 is a block diagram of a controller.

The controller 8 is a so-called electronic control unit (ECU) and is composed of a computer including a processor 50, such as a central processing unit (CPU) and a micro processor unit (MPU), a memory 56 such as a non-volatile memory 52 (e.g., a read-only memory (ROM)) and a volatile memory 54 (e.g., a random access memory (RAM)), and a storage device 58 such as a hard disk drive (HDD) and a solid state drive (SSD), as shown in FIG. 6. The controller 8 is mounted to the main body 2 and is connected to each of the drive units 6 and a battery (not shown in the drawings).

The controller 8 may be configured by a single piece of hardware or may be configured as a unit composed of multiple pieces of hardware. Also, at least some of the functional units of the controller 8 may be realized by hardware such as an LSI, an ASIC, an FPGA, etc., or may be realized by the combination of software and hardware.

As shown in FIG. 5, the controller 8 controls the drive units 6 to control the travel of the cart 1 by executing, with the processor 50, the computational processing in accordance with programs stored in the memory 56 and the storage device 58.

Specifically, the controller 8 executes a provisional velocity setting process of calculating, based on the detection result of the input sensor 10, a velocity in the x direction required of the cart 1 (hereinafter, the provisional longitudinal velocity $v_x$), a velocity in the y direction required of the cart 1 (hereinafter, the provisional lateral velocity $v_y$), and an angular velocity about the z axis passing through the center of gravity G required of the cart 1 (hereinafter, the provisional yaw rate $w_z$).

When the provisional velocity setting process is completed, the controller 8 sets a target lateral velocity $v_y'$, a target longitudinal velocity $v_x'$, and a target yaw rate $w_z'$ at which the cart 1 can travel stably based on the provisional lateral velocity $V_y$, the provisional longitudinal velocity $v_x$, and the provisional yaw rate $w_z$, and executes a velocity control process of controlling the drive unit 6 such that the cart 1 moves at the target lateral velocity $v_y'$, the target longitudinal velocity $v_x'$, and the target yaw rate $w_z$. Thereby, the cart 1 is prevented from spinning and stable travel of the cart 1 is realized.

To execute the provisional velocity setting process, the controller 8 includes, as functional units thereof, a provisional velocity determination unit 62 and a storage unit 64 for storing various parameters, as shown in FIG. 5. Also, to execute the velocity control process, the controller 8 includes, in addition to the storage unit 64, an estimation unit 66 configured to estimate the distance between the ground contact position P1 of each swivel caster 5 and the center of gravity G of the cart 1 in the front-rear direction, a limit velocity calculation unit 68 configured to calculate a stability limit velocity $V_{max}$ by using the distance estimated by the estimation unit 66, a target velocity setting unit 70 configured to calculate a target velocity based on the stability limit velocity, and a driving control unit 72 configured to control the drive units 6.

Each of these functional units, namely, the provisional velocity determination unit 62, the estimation unit 66, the limit velocity calculation unit 68, the target velocity setting unit 70, and the driving control unit 72, is realized by executing a predetermined program with the processor 50. The storage unit 64 is composed of the storage device 58 and/or the memory 56.

In the following, each of the provisional velocity determination unit 62, the storage unit 64, the estimation unit 66, the limit velocity calculation unit 68, the target velocity setting unit 70, and the driving control unit 72 will be described in detail.

The provisional velocity determination unit 62 calculates, based on the detection result of the input sensor 10, the provisional lateral velocity $v_y$, which is a tentative moving velocity in the left-right direction, the provisional longitudinal velocity $v_x$, which is a tentative moving velocity in the front-rear direction, and the provisional yaw rate $w_z$, which is a tentative yaw rate. For example, when the lateral load acquired by the input sensor 10 is greater than a predetermined threshold value, the provisional velocity determination unit 62 may set the provisional yaw rate $w_z$ to zero, the provisional lateral velocity $v_y$ to be proportional to the lateral load, and the provisional longitudinal velocity $v_x$ to be proportional to the longitudinal load, so as to cause the cart 1 to undergo a translational movement. On the other hand, when the lateral load acquired by the input sensor 10 is less than or equal to the predetermined threshold value, the provisional velocity determination unit 62 may set the provisional longitudinal velocity $v_x$ to be proportional to the longitudinal load and the provisional yaw rate $w_z$ to be proportional to the lateral load, so as to turn the cart 1. Also, for example, the provisional velocity determination unit 62 may determine in advance a reference point where the longitudinal velocity, the lateral velocity, and the yaw rate are to be set, convert the longitudinal load, the lateral load, and the yaw moment acquired by the input sensor 10 into the longitudinal load, the lateral load, and the yaw moment at the reference point, and set the provisional longitudinal velocity $v_x$ at the reference point to be proportional to the longitudinal load at the reference point, the provisional lateral velocity $v_y$ at the reference point to be proportional to the lateral load at the reference point, and the provisional yaw rate $w_z$ at the reference point to be proportional to the yaw moment at the reference point. The reference point may be set to the center of gravity G, for example.

Note that the present invention is not limited to the determination method of the provisional lateral velocity $v_y$, the provisional longitudinal velocity $v_x$, and the provisional yaw rate $w_z$ by the provisional velocity determination unit 62. The provisional velocity determination unit 62 may determine the provisional lateral velocity $V_y$, the provisional longitudinal velocity $v_x$, and the provisional yaw rate $w_z$ based on an input to a terminal from the operator who operates the cart 1. Also, the provisional velocity determination unit 62 may autonomously determine the provisional lateral velocity $v_y$, the provisional longitudinal velocity $v_x$, and the provisional yaw rate $w_z$ based on the set travel route and the detection result of sensors (such as a camera, a radar, a lidar, etc.) for detecting objects or the like located in the surroundings.

The storage unit 64 stores data related to the travel control of the cart 1. The data stored in the storage unit 64 at least includes a mass m of the cart 1, a cornering power $K_r$ of the swivel caster 5, a cornering power $K_r$ of the omnidirectional wheel 3, and a distance $L_r$ from the ground contact position P2 of the omnidirectional wheel 3 to the center of gravity G in the front-rear direction (the distance in the front-rear direction may be also referred to as the front-rear distance). Note that the cart 1 of the illustrated embodiment has a laterally symmetrical structure, and the cornering power $K_r$ is the same for the left and right swivel casters 5, the cornering power $K_r$ is the same for the left and right omnidirectional wheels 3, and the front-rear distance $L_r$ is the same for the left and right omnidirectional wheels 3. Therefore, the storage unit 64 may store the cornering power $K_r$ of one of the left and right swivel casters 5, the cornering power $K_r$ of one of the left and right omnidirectional wheels 3, and the front-rear distance $L_r$ from the ground contact position P2 of one of the omnidirectional wheel 3 to the center of gravity G.

The cornering power means a rising gradient of a cornering force of the corresponding wheel (the omnidirectional wheel 3 or the swivel caster 5) with respect to the sideslip angle. The cornering force means a force in the lateral direction (namely, in a direction parallel to the axle) generated by the corresponding wheel during a turn (this force may be also referred to as a lateral force or a turning centripetal force).

In the present embodiment, the storage unit 64 further stores a distance $L_0$ from the center of gravity G to the axis L1 in the front-rear direction and a distance d from the axis L1 to the ground contact position P1 of the wheel 42B of the swivel caster 5 (see FIG. 2). Here, since the cart 1 of the illustrated embodiment has a laterally symmetrical structure as mentioned above, the distance $L_0$ and the distance d are the same for the left and right swivel casters 5, and thus, the storage unit 64 may store the distance $L_0$ and the distance d regarding one of the left and right swivel casters 5.

The estimation unit 66 estimates a distance from the ground contact position P1 of the swivel caster 5 to the center of gravity G in the front-rear direction (hereinafter, the caster distance $L_f$). When the distance (front-rear distance) from the ground contact position P1 of each of the left and right swivel casters 5 to the center of gravity G in the front-rear direction is acquired, the estimation unit 66 may preferably estimate the caster distance $L_f$ by averaging the front-rear distance from the ground contact position P1 of the left swivel caster 5 to the center of gravity G and the front-rear distance from the ground contact position P1 of the right swivel caster 5 to the center of gravity G.

For example, the estimation unit 66 may estimate the caster distance $L_f$ by using the following formula (1) (note that, in the formula (1), $\varphi_{fL}$ represents the angle of the travel direction of the left swivel caster 5 with respect to the forward direction (0°), $\varphi_{fR}$ represents the angle of the travel direction of the right swivel caster 5 with respect to the forward direction, and $L_s$ represents the distance from the axis L1 to the center of gravity G in the left-right direction).

$$L_f = L_0 - \frac{1}{2}(d\cos\varphi_{fL} + d\cos\varphi_{fR}) \tag{1}$$

-continued $$\left(\text{where } \varphi_{fL} = \arctan\left(\frac{v_y + L_0 w_z}{v_x - L_s w_z}\right),\ \varphi_{fR} = \arctan\left(\frac{v_y + L_0 w_z}{v_x + L_s w_z}\right)\right)$$

When a predetermined calculation condition is satisfied, the limit velocity calculation unit 68 calculates the stability limit velocity $V_{max}$ below which the cart 1 can travel (move) stably. First of all, the limit velocity calculation unit 68 acquires the caster distance $L_f$ (the distance from the ground contact position P1 of the swivel caster 5 to the center of gravity G in the front-rear direction) estimated by the estimation unit 66, and acquires $K_f$, $K_r$, and $L_r$ from the storage unit 64.

Next, the limit velocity calculation unit 68 determines whether the following formula (2) is satisfied by using the acquired $K_f$, $K_r$, $L_f$, and $L_r$.

$$K_f L_f - K_r L_r > 0 \tag{2}$$

When the formula (2) is satisfied, the limit velocity calculation unit 68 acquires the mass m of the cart 1 stored in the storage unit 64, and calculates the stability limit velocity $V_{max}$ by using the following formula (3).

$$V_{max} = \sqrt{\frac{2K_f K_r (L_f + L_r)^2}{m(K_f L_f - K_r L_r)}} \tag{3}$$

The stability limit velocity $V_{max}$ represents the limit velocity (speed) below which the cart 1 can travel stably when the formula (2) is satisfied. It can be said that the formula (2) represents a calculation condition for the limit velocity calculation unit 68 to calculate the stability limit velocity $V_{max}$.

When the stability limit velocity $V_{max}$ is not calculated by the limit velocity calculation unit 68 (namely, when the formula (2) is not satisfied), the target velocity setting unit 70 sets the provisional lateral velocity $v_y$, the provisional longitudinal velocity $v_x$, and the provisional yaw rate $w_z$ as the target lateral velocity $v_y'$, the target longitudinal velocity $v_x'$, and the target yaw rate $w_z'$.

When the stability limit velocity $V_{max}$ is calculated by the limit velocity calculation unit 68 (namely, when the formula (2) is satisfied), the target velocity setting unit 70 calculates a coefficient R by using the following formula (4).

$$R = \begin{cases} 1 & \sqrt{v_x^2 + v_y^2}\ (\equiv v) < V_{max} \\ \dfrac{V_{max}}{\sqrt{v_x^2 + v_y^2}} & \sqrt{v_x^2 + v_y^2}\ (= v) \geq V_{max} \end{cases} \tag{4}$$

Namely, when the square root of the sum of the square of the provisional lateral velocity $v_y$ and the square of the provisional longitudinal velocity $v_x$ (hereinafter, the magnitude of the provisional velocity (v in the formula (4))) is less than the stability limit velocity $V_{max}$, the coefficient R is set to 1, and when the magnitude of the provisional velocity is greater than or equal to the stability limit velocity $V_{max}$, the coefficient R is set to a value obtained by dividing the stability limit velocity $V_{max}$ by the magnitude of the provisional velocity ($V_{max}$/v).

When the stability limit velocity $V_{max}$ is calculated by the limit velocity calculation unit 68 (namely, when the formula (2) is satisfied), the target velocity setting unit 70 may calculate the coefficient R by using the following formula (5).

$$R = \min\left\{\frac{V_{max}}{\sqrt{v_x^2 + v_y^2}}, 1\right\} \tag{5}$$

Here, min {a, b} in the formula (5) represents the minimum value of {a, b} (smaller value of a and b).

Next, the target velocity setting unit 70 multiplies each of the provisional lateral velocity $v_y$, the provisional longitudinal velocity $v_x$, and the provisional yaw rate $w_z$ by the coefficient R, and sets them as the target lateral velocity $v_y'$, the target longitudinal velocity $v_x'$, and the target yaw rate $w_z'$. Namely, the target velocity setting unit 70 acquires the target lateral velocity $v_y'$, the target longitudinal velocity $v_x'$, and the target yaw rate $w_z'$ by using the following formula (6). Thereby, the target lateral velocity $v_y'$, the target longitudinal velocity $v_x'$, and the target yaw rate $w_z'$ are set to values obtained by multiplying the provisional lateral velocity $v_y$, the provisional longitudinal velocity $v_x$, and the provisional yaw rate $w_z$ by the coefficient R, respectively.

$$v_x' = Rv_x,\ v_y' = Rv_y,\ \omega_z' = R\omega_z \tag{6}$$

The driving control unit 72 controls the drive unit 6 so that the cart 1 travels at the target lateral velocity $v_y'$, the target longitudinal velocity $v_x'$, and the target yaw rate $w_z'$ set by the target velocity setting unit 70.

Next, a process executed by the controller 8 when the cart 1 travels will be described. The controller 8 (specifically, the processor 50 of the controller 8) calculates the provisional lateral velocity $v_y$, the provisional longitudinal velocity $v_x$, and the provisional yaw rate $w_z$ based on the input to the input sensor 10. Upon completion of the calculation of the provisional lateral velocity $v_y$, the provisional longitudinal velocity $v_x$, and the provisional yaw rate $w_z$, the controller 8 executes the velocity control process. Preferably, the controller 8 executes the velocity control process every time the calculation of the provisional lateral velocity $v_y$, the provisional longitudinal velocity $v_x$, and the provisional yaw rate $w_z$ is performed.

Figure 7:
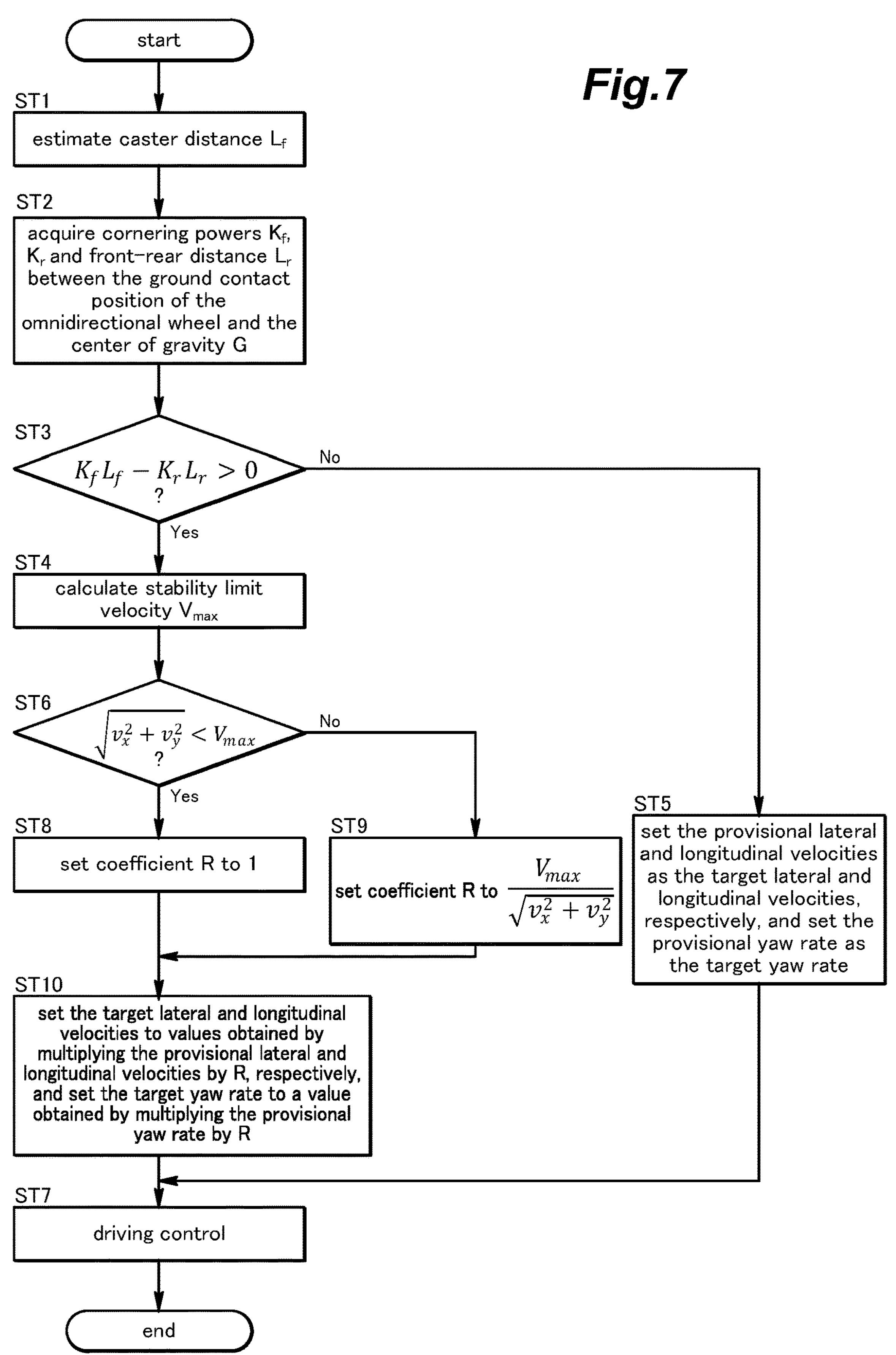
FIG. 7 is a flowchart showing a velocity control process executed by the controller.

In the following, the velocity control process executed by the controller 8 will be described in detail with reference to the flowchart shown in FIG. 7.

In the first step ST1 of the velocity control process, the processor 50 of the controller 8 (the estimation unit 66) estimates the caster distance $L_f$ based on the provisional lateral velocity $v_y$, the provisional longitudinal velocity $v_x$, and the provisional yaw rate $w_z$. For example, the processor 50 of the controller 8 may estimate the caster distance $L_f$ by using the formula (1). Upon completion of the estimation, the processor 50 of the controller 8 executes step ST2.

In step ST2, the processor 50 acquires, from the storage device 58, the cornering power $K_f$ of the swivel caster 5, the distance $L_r$ between the ground contact position P2 of the omnidirectional wheel 3 and the center of gravity G in the front-rear direction, and the cornering power $K_r$ of the omnidirectional wheel 3. Upon completion of the acquisition, the processor 50 executes step ST3.

In step ST3, the processor 50 (the limit velocity calculation unit 68) determines whether the formula (2) (namely, $K_fL_f-K_rL_r>0$) is satisfied by using $L_f$ acquired in ST1 and $K_f$, $K_r$, and $L_r$ acquired in ST2. When the formula (2) is satisfied, the processor 50 executes step ST4, and when the step (2) is not satisfied, the processor 50 executes step ST5.

In step ST4, the processor 50 (the limit velocity calculation unit 68) calculates the stability limit velocity $V_{max}$ by using the formula (5). Upon completion of the calculation, the processor 50 executes the step ST6.

In step ST5, the processor 50 (the target velocity setting unit 70) sets the provisional lateral velocity $v_y$ as the target lateral velocity $v_y'$, sets the provisional longitudinal velocity $v_x$ as the target longitudinal velocity $v_x'$, and sets the provisional yaw rate $w_z$ as the target yaw rate $w_z$. Upon completion of the setting, the processor 50 executes step ST7.

In step ST6, the processor 50 (the target velocity setting unit 70) determines whether the magnitude of the provisional velocity v is less than the stability limit velocity $V_{max}$. When the magnitude of the provisional velocity v is less than the stability limit velocity $V_{max}$, the processor 50 executes step ST8, and when the magnitude of the provisional velocity v is greater than or equal to the stability limit velocity $V_{max}$, the processor 50 executes step ST9.

In step ST7, the processor 50 (the driving control unit 72) controls the drive unit 6 so that the cart 1 travels at the target lateral velocity $v_y'$, the target longitudinal velocity $v_x'$, and the target yaw rate $w_z'$. Upon completion of the control, the processor 50 ends the velocity control process.

In step ST8, the processor 50 (the target velocity setting unit 70) sets the coefficient R to 1. Upon completion of the setting of the coefficient R, the processor 50 executes step ST10.

In step ST9, the processor 50 (the target velocity setting unit 70) sets the coefficient R to a value obtained by dividing the stability limit velocity $V_{max}$ by the magnitude of the provisional velocity v. Upon completion of the setting of the coefficient R, the processor 50 executes step ST10.

In step ST10, the processor 50 (the target velocity setting unit 70) sets the target lateral velocity $v_y'$, the target longitudinal velocity $v_x'$, and the target yaw rate $w_z'$ by using the formula (8). Specifically, the processor 50 sets the target lateral velocity $v_y'$ to a value obtained by multiplying the provisional lateral velocity $v_y$ by R, sets the target longitudinal velocity $v_x'$ to a value obtained by multiplying the provisional longitudinal velocity $v_x$ by R, and sets the target yaw rate $w_z'$ to a value obtained by multiplying the provisional yaw rate $w_z$ by R.

Upon completion of the setting of the target lateral velocity $v_y'$, the target longitudinal velocity $v_x'$, and the target yaw rate $w_z'$, the processor 50 (the target velocity setting unit 70) executes step ST7 to control the drive unit 6 so that the cart 1 travels at the target lateral velocity $v_y'$, the target longitudinal velocity $v_x'$, and the target yaw rate $w_z'$. Upon completion of the control, the processor 50 ends the velocity control process.

Next, the operation and effect of the cart 1 configured as above will be described.

When an input is detected by the input sensor 10, the controller 8 calculates the provisional lateral velocity $v_y$, the provisional longitudinal velocity $v_x$, and the provisional yaw rate $w_z$ based on the input to the input sensor 10. Thereafter, the controller 8 executes the velocity control process. In the velocity control process, the controller 8 sets the target lateral velocity $v_y'$, the target longitudinal velocity $v_x'$, and the target yaw rate $w_z$. At this time, when the formula (2) is satisfied ($K_fL_f-K_rL_r>0$) and the magnitude of the provisional velocity is greater than or equal to the stability limit velocity $V_{max}$, the coefficient R is set to a value less than or equal to 1, and therefore, the velocity of the cart 1 is limited to be less than or equal to the stability limit velocity.

The motion of the cart 1 can be described by the equation of motion represented by the following formula (7).

$$\begin{cases} m\dot{V}_y + \mathrm{m}V_x W_z = F_{fL} + F_{fR} + F_{rL} + F_{rR} \\ I_z\dot{W}_z = (F_{fL} + F_{fR})L_f - (F_{rL} + F_{rR})L_r \end{cases} \tag{7}$$

In the formula (7), $V_x$ represents the x component of the velocity of the cart 1, $V_y$ represents the y component of the velocity of the cart 1, $W_z$ represents the angular velocity about the z axis passing through the center of gravity G of the cart 1, and "." represents a time derivative. Further, $I_z$ represents the moment of inertia about the z axis passing through the center of gravity G of the cart 1, $F_{rL}$ and $F_{rR}$ represent the lateral force applied to the left and right swivel casters 5, respectively, and $F_{rL}$ and $F_{rR}$ represent the lateral force applied to the left and right omnidirectional wheels 3, respectively.

Here, a situation is assumed in which the steering angle of the swivel casters 5 becomes φ when the cart 1 is traveling straight at a constant speed (see FIG. 2).

In the formula (7), each lateral force can be expressed by a product of the sideslip angle θ and the related cornering power, and suppose that the sideslip angle θ is sufficiently small, $V_x$ can be approximated by the square root of the sum of the square of $V_x$ and the square of $V_y$ (namely, the speed V), and $V_y$ can be approximated by Ve, and hence, the following formula (8) can be obtained.

$$\begin{cases} \mathrm{mV}(\dot{\theta} + W_z) = -2K_f\left(\theta + \frac{W_zL_f}{V} - \varphi\right) - 2K_r\left(\theta - \frac{W_zL_r}{V}\right) \\ I_z\dot{W}_z = -2K_fL_f\left(\theta + \frac{W_zL_f}{V} - \varphi\right) + 2K_rL_r\left(\theta - \frac{W_zL_r}{V}\right) \end{cases} \tag{8}$$

By deforming the formula (8), the following formula (9) can be obtained, which represents a system where the steering angle φ is the input.

$$\begin{bmatrix} \dot{\theta} \\ \dot{W}_z \end{bmatrix} = \begin{bmatrix} -\frac{2(K_f + K_r)}{\mathrm{mV}} & -\frac{2(K_fL_f - K_rL_r)}{\mathrm{mV}^2} - 1 \\ -\frac{2(K_fL_f - K_rL_r)}{I_z} & -\frac{2(K_fL_f^2 + K_rL_r^2)}{I_zV} \end{bmatrix}\begin{bmatrix} \theta \\ W_z \end{bmatrix} + \begin{bmatrix} \frac{2K_f}{\mathrm{mV}}\varphi \\ \frac{2K_fL_f}{I_z}\varphi \end{bmatrix} \tag{9}$$

By taking the Laplace transform of the formula (9), the formula (10) is obtained.

$$\begin{cases} \frac{\theta(s)}{\varphi(s)} = \frac{\frac{2K_f}{\mathrm{mV}}\left\{s + \frac{2K_rL_r(L_f + L_r) - L_f\mathrm{mV}^2}{I_zV}\right\}}{D(s)} = G_\theta(s) \\ \frac{W_z(s)}{\varphi(s)} = \frac{\frac{2K_fL_f}{I_z}\left\{s + \frac{2K_r(L_f + L_r)}{\mathrm{mV}L_f}\right\}}{D(s)} = G_W(s) \end{cases} \tag{10}$$

$G_\theta(s)$ and $G_W(s)$ each correspond to a transfer function. Note that D(s) in the formula (10) is represented by the following formula (11).

$$\begin{aligned} D(s) &= s^2 + \frac{2I_z(K_f + K_r) + 2m(K_fL_f^2 + K_rL_r^2)}{I_z\mathrm{mV}}s \\ &\quad + \frac{4K_fK_r(L_f + L_r)^2 - 2\mathrm{mV}^2(K_fL_f - K_rL_r)}{I_z\mathrm{mV}^2} \\ &:= s^2 + as + b \end{aligned} \tag{11}$$

Figure 8A:
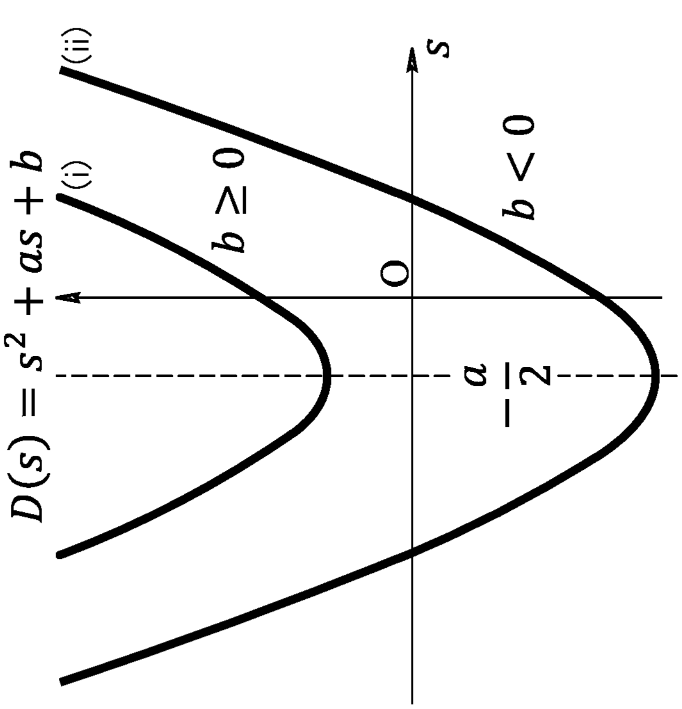
FIG. 8A is a graph showing the s-dependency of D(s)

When the real part of the pole of each transfer function, namely, the real part of s for which D(s) is 0, is less than or equal to 0, the travel of the cart 1 is stable. As shown by (i) and (ii) in FIG. 8A, D(s) is a quadratic function of s, and a in the formula (11) is always positive, and thus, the travel of the cart 1 is stable when b≥0, namely, when the following formula (12) is satisfied.

$$\frac{4K_fK_r(L_f + L_r)^2 - 2\mathrm{mV}^2(K_fL_f - K_rL_r)}{I_z\mathrm{mV}^2} \geq 0 \tag{12}$$

Figure 8B:
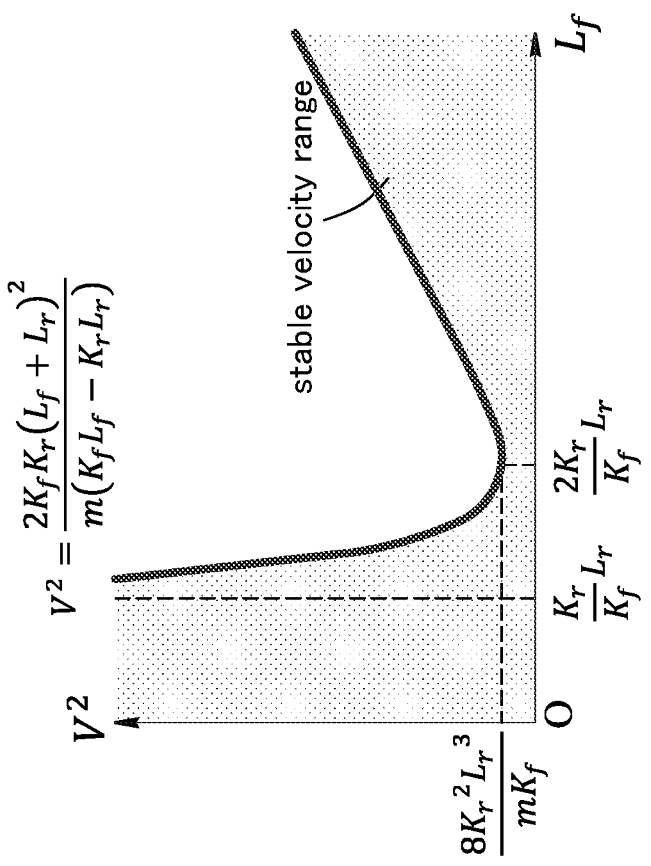
FIG. 8B is a graph showing a stable velocity range, with the horizontal axis representing $L_f$ and the vertical axis representing $V^2$.

The shaded region in FIG. 8B indicates a region in which the formula (12) is satisfied, namely, a stable velocity range in which the travel of the cart 1 is stable, in a graph with a horizontal axis representing $L_f$ and a vertical axis representing $V^2$. It can be seen from FIG. 8B that when the ground contact position P1 of the front wheel (the swivel caster 5) is near the center of gravity G, the travel of the cart 1 is stable, and as the ground contact position P1 moves away from the center of gravity G, the stable velocity range sharply becomes narrower. Then, as the ground contact position P1 moves further away from the center of gravity G beyond a certain point, the stable velocity range becomes wider.

Such analysis of the traveling stability of the cart 1 using D(s) is referred to herein as the stability analysis.

Next, the attractor $[\Theta\ \Omega]^T$ of the system is considered. The gradient vector of the formula (10) becomes zero when the following formula (13) is satisfied.

$$\begin{cases} \Theta = \frac{2K_fK_rL_r(L_f + L_r) - K_fL_f\mathrm{mV}^2}{2K_fK_r(L_f + L_r)^2 - m(K_fL_f - K_rL_r)V^2}\varphi := C_\theta(V, L_f)\varphi \\ \Omega = \frac{2K_fK_r(L_f + L_r)V}{2K_fK_r(L_f + L_r)^2 - m(K_fL_f - K_rL_r)V^2}\varphi := C_{w_z}(V, L_f)\varphi \end{cases} \tag{13}$$

Note that in the formula (13), Θ and Ω respectively represent θ(0) and $W_z$ (0), which are values of θ and $W_z$ when 0 is substituted for s in the formula (10).

According to the formula (13), it can be seen that the attractor is proportional to the steering angle φ. Namely, $C_\theta(V, L_f)$ and $C_{wz}(V, L_f)$ can be considered to represent the sensitivity of the sideslip angle θ and the angular velocity $W_z$ to the steering angle φ. The greater the values of $C_\theta(V, L_f)$ and $C_{wz}(V, L_f)$ are, the larger the attractor fluctuates when the steering angle φ fluctuates.

The traveling stability of the cart 1 is classified into the following three patterns (i) to (iii).

Figures 9A, 9B:
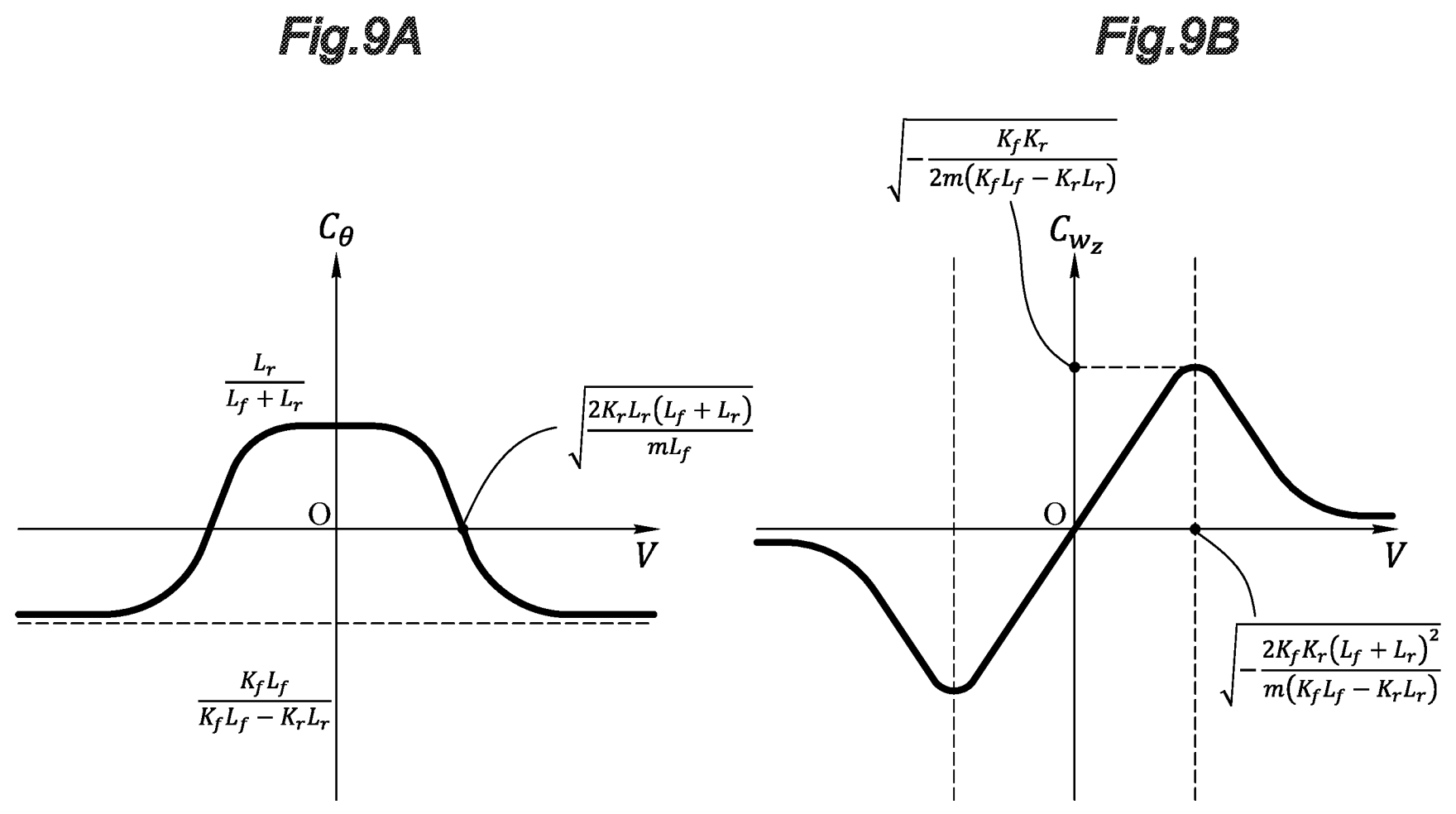

(i) When $K_fL_f - K_rL_r < 0$: As shown in FIGS. 9A and 9B, $C_\theta$ and $C_{wz}$ are both bounded, and the sensitivity does not increase sharply with the speed V. In this case, the system is asymptotically stable from the result of the stability analysis.

Figures 10A, 10B:
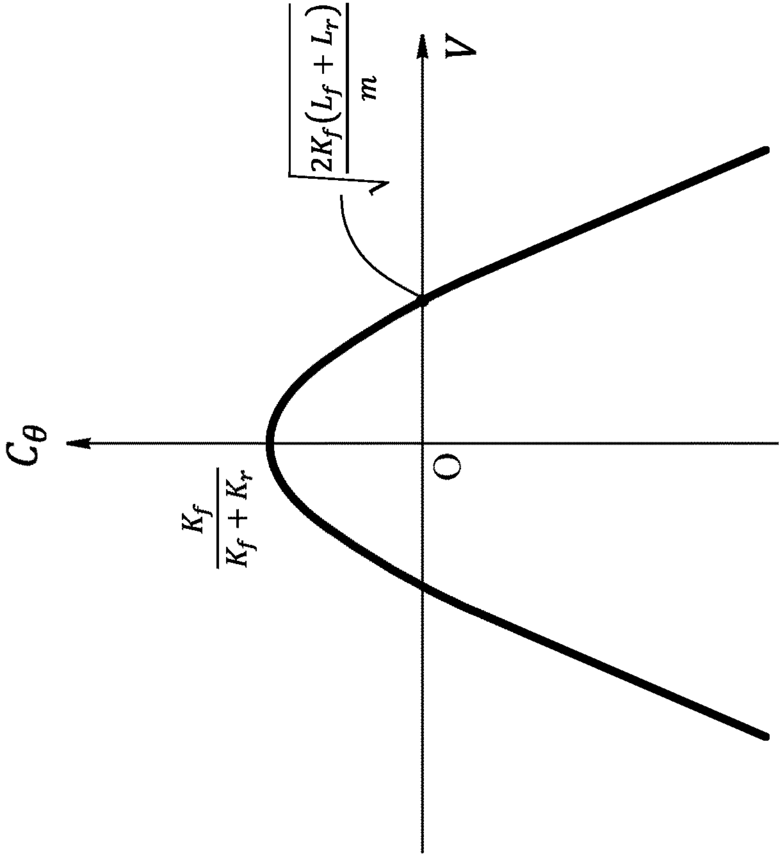
FIG. 10A is a graph showing the V-dependency of $C_\theta(V, L_f)$ when $K_fL_f-K_rL_r=0$.
FIG. 10B is a graph showing the V-dependency of $C_{wz}(V, L_f)$ when $K_fL_f-K_rL_r=0$.

(ii) When $K_f L_f - K_r L_r = 0$: As shown in FIG. 10A, $C_\theta$ is bounded above. As shown in FIGS. 10A and 10B, for both $C_\theta$ and $C_{wz}$, the sensitivity basically increases with the speed V. In this case, the system is asymptotically stable from the result of the stability analysis.

Figures 11A, 11B:
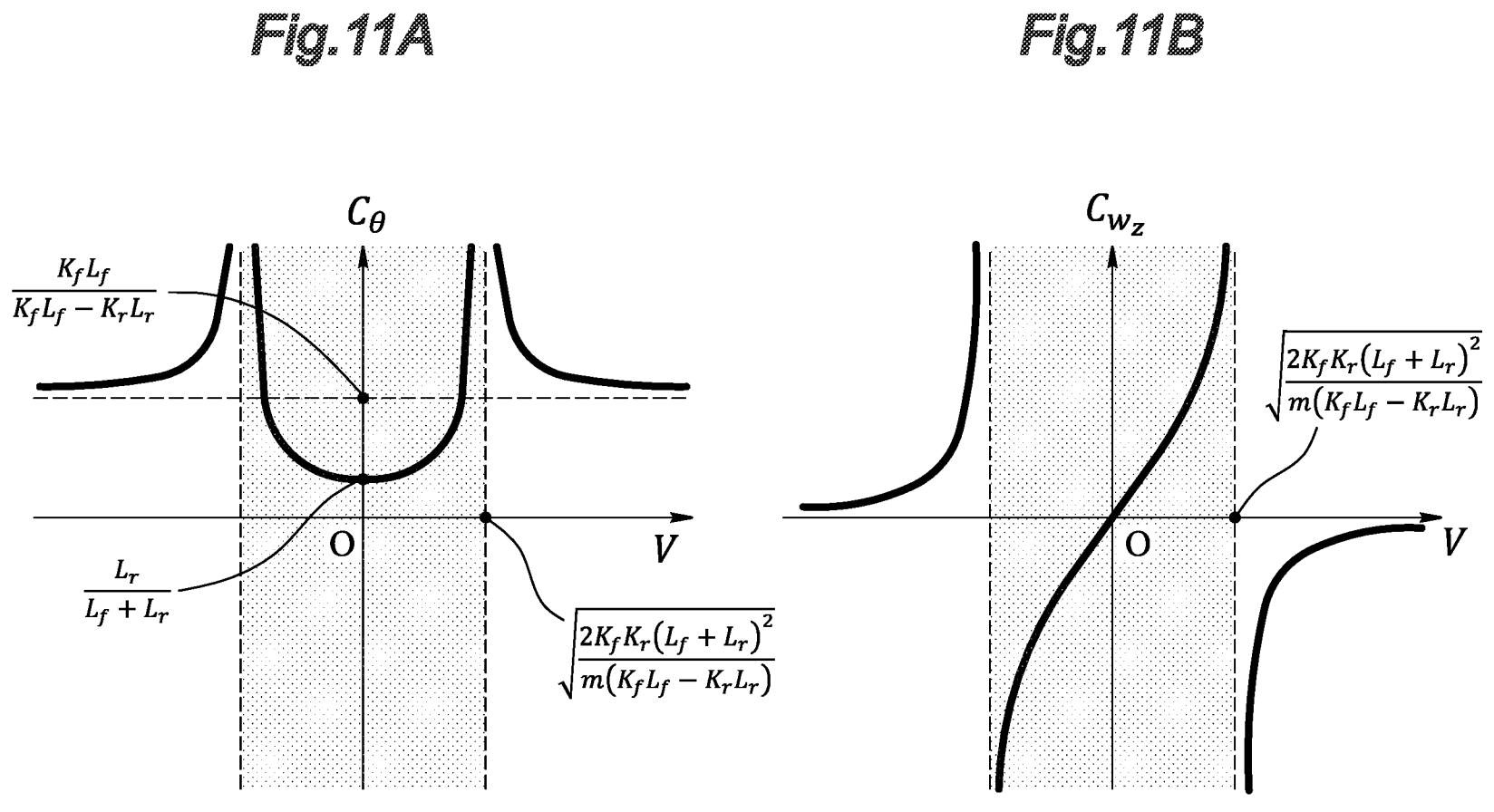

(iii) When $K_f L_f - K_r L_r > 0$: $C_\theta$ bounded below. As shown in FIGS. 11A and 11B, the sensitivity increases sharply in the vicinity of $V^2 = V_{max}^2$ (see the formula (3)). The shaded region in each of FIGS. 11A and 11B corresponds to a stable region of the system.

In the case where the cart 1 moves backward also, the formulas (7) to (13) hold. Namely, in both the forward movement and the backward movement, the travel of the cart 1 is stable when the formula (12) holds.

In the case where $K_f L_f - K_r L_r \leq 0$, the formula (12) always holds. In the case where the stability limit velocity $V_{max}$ is not set, and the provisional lateral velocity $v_y$, the provisional longitudinal velocity $v_x$, and the provisional yaw rate $w_z$ are respectively set as the target lateral velocity $v_y'$, the target longitudinal velocity $v_x'$, and the target yaw rate $w_z'$ also, the travel of the cart 1 is stable.

In the case where $K_f L_f - K_r L_r > 0$, the formula (12) holds when the speed V of the cart 1 is less than or equal to the stability limit velocity $V_{max}$. In the case where $K_f L_f - K_r L_r > 0$, the processor 50 sets the stability limit velocity $V_{max}$, and limits the square root of the sum of the square of the target lateral velocity $v_y'$ and the square of the target longitudinal velocity $v_x'$ to be less than or equal to the stability limit velocity $V_{max}$. Accordingly, the velocity of the cart 1 becomes less than or equal to the stability limit velocity $V_{max}$, and stable travel of the cart 1 is realized.

Particularly, since the distance between the ground contact position P1 of the swivel caster 5 and the center of gravity G becomes longer when the cart 1 moves backward (see FIG. 12B) than when the cart 1 moves forward (see FIG. 12A), the travel of the cart 1 is more likely to be unstable when the cart 1 moves backward. According to the present invention, since the velocity of the cart 1 is limited to be less than or equal to the stability limit velocity, stable travel of the cart 1 is realized even when the cart 1 moves backward.

Figure 13:
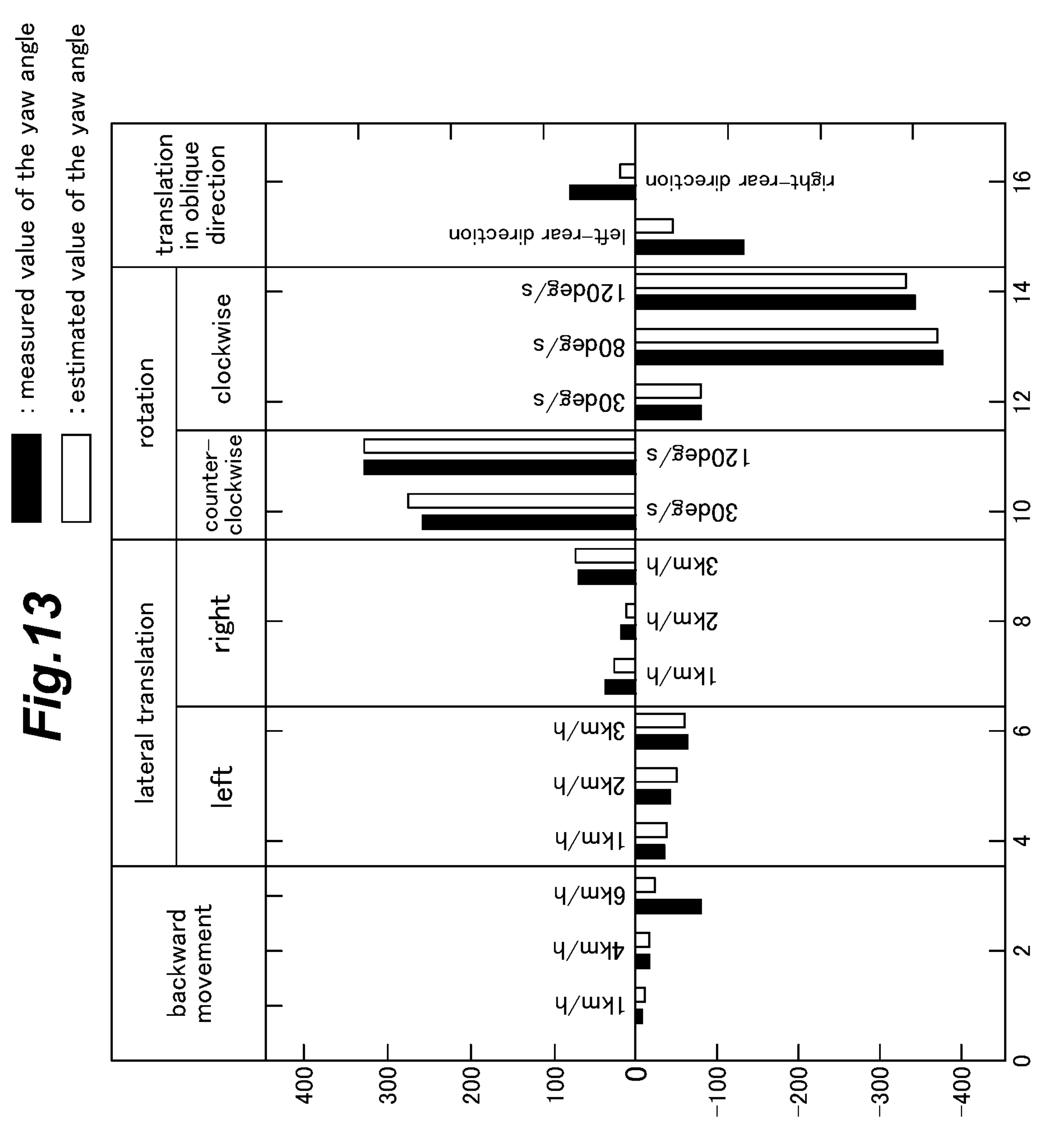
FIG. 13 is a graph showing a measured value (odometry value) and an estimated value of the yaw angle for various movements after calibration.

FIG. 13 shows an example in which calibration of the omnidirectional wheels 3 of the cart 1 is performed. "Calibration" here means a process for acquiring correction factors to correct the difference between the command value for the driving amount of each omnidirectional wheel 3 from the corresponding drive unit 6 and the actual driving amount of the omnidirectional wheel 3. FIG. 13 shows the difference between a theoretical value (estimated value) of the yaw angle according to the command value and a measured value (odometry value) of the yaw angle according to the odometry method for various movements of the cart 1 including backward movement, by using the correction factors obtained by the calibration. As can be understood from FIG. 13, even when moving backward, the difference between the theoretical value (estimated value) and the measured value is small, and appropriate correction is possible.

In the above embodiment, the controller 8 was configured to execute the velocity control process regardless of the magnitude of the provisional yaw rate $w_z$, but in another embodiment, the controller 8 may be configured to execute the velocity control process when the magnitude of the provisional yaw rate $w_z$ is greater than or equal to a predetermined threshold value (hereinafter, the yaw rate threshold value). Thereby, when $K_f L_f - K_r L_r > 0$ and the magnitude of the provisional yaw rate is greater than or equal to the yaw rate threshold value, the stability limit velocity $V_{max}$ is set. Thus, in this case, the calculation condition for the limit velocity calculation unit 68 to calculate the stability limit velocity $V_{max}$ includes that $K_f L_f - K_r L_r > 0$ and that the magnitude of the provisional yaw rate is greater than or equal to the yaw rate threshold value.

Thereby, when the cart 1 turns, the velocity is prevented from exceeding the stability limit velocity $V_{max}$, so that spin of the vehicle can be prevented. In addition, since the velocity during translational movement (during translation) is not limited to be less than or equal to the stability limit velocity, the cart 1 can be moved quickly.

Besides, the swivel caster 5 may be provided with a rotation angle sensor 90 (see FIGS. 12A and 12B) to detect the rotation angle of the fork 42A. In that case, the estimation unit 66 may calculate (estimate) the caster distance $L_f$ based on the rotation angle detected by the rotation angle sensor 90.

Concrete embodiments of the present invention have been described in the foregoing, but the present invention is not limited to the above embodiments and various modifications and alterations are possible. For example, in the above embodiment, an example in which the mobile body according to the present invention is embodied as the cart 1 was described, but the present invention may be applicable to any mobile body that is configured to move on a road surface. For example, the present invention is applicable to a vehicle such as a wheelchair, a wagon for transporting goods, etc.

The invention claimed is:

1. A mobile body, comprising:
- a main body;
- a pair of left and right driving wheels provided on the main body;
- a drive unit configured to drive each of the driving wheels;
- a pair of left and right swivel casters respectively provided in front of the driving wheels, and each supported on the main body to be swivelable about an axis extending in an up-down direction; and
- a controller configured to control the drive unit,
- wherein the controller comprises:
- an estimation unit configured to estimate a representative front-rear distance for the pair of left and right swivel casters with respect to a center of gravity by averaging a front-rear distance from a ground contact position of the left swivel caster to a center of gravity and a front-rear distance from a ground contact position of the right swivel caster to the center of gravity;
- a limit velocity calculation unit configured to calculate a stability limit velocity based on the representative front-rear distance estimated by the estimation unit, a front-rear distance of the one of the left and right driving wheels between respective ground contact positions thereof and the center of gravity, a cornering power of the one of the left and right driving wheels, and a cornering power of the one of the left and right swivel casters when a predetermined calculation condition is satisfied; and
- a driving control unit configured to control the drive unit such that a velocity of the mobile body is less than or equal to the stability limit velocity when the stability limit velocity is calculated by the limit velocity calculation unit.

2. The mobile body according to claim 1, wherein the limit velocity calculation unit calculates the stability limit velocity according to a formula (A) below, $$V_{max} = \sqrt{\frac{2K_f K_r (L_f + L_r)^2}{m(K_f L_f - K_r L_r)}} \quad (A)$$

wherein $V_{max}$ represents the stability limit velocity, m represents a mass of the mobile body, $K_f$ represents the cornering power of the one of the left and right swivel casters, $K_r$ represents the cornering power of the one of the left and right driving wheels, $L_f$ represents the representative front-rear distance estimated by the estimation unit, and $L_r$ represents the front-rear distance of the one of left and right driving wheels between respective ground contact positions thereof and the center of gravity.

3. The mobile body according to claim 1, wherein each of the left and right driving wheels is an omnidirectional wheel capable of translational movement in a left-right direction.

4. The mobile body according to claim 2, wherein the calculation condition includes $K_f L_f - K_r L_r > 0$.

5. The mobile body according to claim 1, comprising:

an input sensor provided on the main body to receive an operation input regarding an operation of the mobile body from an operator;

a provisional velocity determination unit configured to calculate a provisional velocity, which is a tentative moving velocity, based on the operation input acquired by the input sensor; and a target velocity setting unit configured to determine a target velocity based on the provisional velocity calculated by the provisional velocity determination unit, wherein when the stability limit velocity is calculated by the limit velocity calculation unit and a magnitude of the provisional velocity calculated by the provisional velocity determination unit is greater than a magnitude of the stability limit velocity, the target velocity setting unit calculates a coefficient by dividing the magnitude of the stability limit velocity by the magnitude of the provisional velocity and acquires the target velocity by multiplying the provisional velocity by the coefficient, and the driving control unit controls the drive unit so as to cause the mobile body to move at the target velocity.

6. The mobile body according to claim 5, wherein the provisional velocity determination unit calculates a provisional yaw rate, which is a tentative yaw rate, based on the operation input, the target velocity setting unit acquires a target yaw rate by multiplying the provisional yaw rate by the coefficient when the stability limit velocity is calculated by the limit velocity calculation unit and the magnitude of the provisional velocity is greater than the magnitude of the stability limit velocity, and the driving control unit controls the drive unit such that a yaw rate of the mobile body becomes the target yaw rate.

7. The mobile body according to claim 6, wherein the limit velocity calculation unit calculates the stability limit velocity according to a formula (A) below, $$V_{max} = \sqrt{\frac{2K_f K_r (L_f + L_r)^2}{m(K_f L_f - K_r L_r)}} \quad (A)$$

wherein $V_{max}$ represents the stability limit velocity, m represents a mass of the mobile body, $K_f$ represents the cornering power of the one of the left and right swivel casters, $K_r$ represents the cornering power of the one of the left and right driving wheels, $L_f$ represents the representative front-rear distance estimated by the estimation unit, and $L_r$ represents the front-rear distance of the one of the left and right driving wheels between the respective ground contact positions thereof and the center of gravity.

8. The mobile body according to claim 7, wherein the calculation condition includes $K_f L_f - K_r L_r > 0$.

9. The mobile body according to claim 8, wherein the calculation condition is that $K_f L_f - K_r L_r > 0$ and a magnitude of the provisional yaw rate is greater than or equal to a predetermined threshold value.

10. The mobile body according to claim 5, wherein the estimation unit estimates directions of wheels of the left and right swivel casters based on the provisional velocity and estimates the representative front-rear distance based on the estimated directions of the wheels.

* * * * *